Patented July 11, 1950

2,514,973

UNITED STATES PATENT OFFICE 2,514,973

METHOD OF PRODUCING MONOCALCIUM PHOSPHATE CONTAINING A HIGH $P_2O_5$ CONTENT

William L. Robinson, Anniston, Ala., assignor to Monsanto Chemical Company, St. Louis, Mo., a corporation of Delaware No Drawing. Application December 22, 1945, Serial No. 637,094

5 Claims. (Cl. 23—109)

This invention relates to a granular, free flowing, substantially, non-caking monocalcium phosphate having a high $P_2O_5$ content and to a process for producing same.

Monocalcium phosphate containing an excess of $P_2O_5$ corresponding to 1% by weight of free $H_3PO_4$ is very hygroscopic and tends to cake and lose its dry free flowing character in a relatively short time. If the $P_2O_5$ content of this product is increased to a value corresponding to 5% free acid, its hygroscopicity is markedly increased with the result that, upon storage, it rapidly sets to a solid crystalline mass.

To offset these objectionable properties it has been the practice to either neutralize the excess acidity or to so proportion the raw materials used in the preparation of monocalcium phosphate that the product contains less than 1% by weight of free acid. These methods of stabilization serve the intended purpose very well except that the potential acidity and also the solubility of the monocalcium phosphate are too low for certain applications. For example, in the beverage industry there has recently been a demand for a granular, free flowing, monocalcium phosphate of high acidity and solubility which may be used in partial or complete substitution of fruit acids such as citric, tartaric, and malic acid and the like. In view of its low acidity and solubility in aqueous media, commercially available monocalcium phosphate is not suitable for this purpose and, so far as I am aware, these properties cannot be improved by the prior art methods without, at the same time, excessively increasing the hygroscopicity and caking tendency of the product.

It is therefore the object of the present invention to provide a process for making a granular, free flowing, substantially non-caking monocalcium phosphate which is readily soluble in aqueous media and which contains $P_2O_5$ in an amount corresponding to a free acid ($H_3PO_4$) content of from 5% to 18.5% and preferably from about 10% to about 18.2% by weight.

In carrying out the present invention, phosphoric acid is thoroughly mixed with granular monocalcium phosphate in the proportions calculated to yield a product containing up to about 18% free $H_3PO_4$, which operation takes place within a period of from about 1.0 to about 5 minutes. At the end of the mixing step, the product is passed through a vibrating screen to break up any lumps which are formed, whereupon it is dried, milled and then screened to the desired size. In this manner, a readily soluble dry granular, free flowing and substantially non-caking monocalcium phosphate of high acidity is produced which is adapted for use as a fruit acid substitute in the production of powdered beverages.

For a more complete understanding of the present invention, reference is made to the following specific examples.

EXAMPLE I 36 lbs. of 80% $H_3PO_4$ was gradually added and mixed in a Baker-Perkins mixer with 100 lbs. of spray dried monocalcium phosphate having the following screen analysis

| | Per cent |
|---|---|
| +80 | 0.8 |
| −80+200 | 20.4 |
| −200 | 79.6 |

After about 3 to 5 minutes, the mixing operation was completed and then the product was put through a ¼ inch vibrating screen to break up any lumps which were formed. The screened product was dried in a stainless steel rotary drier heated with hot air at 90° C. to 100° C., whereupon it was milled in a hammer mill and finally passed through a 10 mesh screen. The resulting product was granular, free flowing and substantially non-caking in character and on analysis was found to have the following $P_2O_5$, free $H_3PO_4$ and moisture content:

| | Per cent |
|---|---|
| $P_2O_5$ | 60.69 |
| Free $H_3PO_4$ | 15.74 |
| Loss at 105° C | 2.92 |

EXAMPLE II 36 lbs. of 80.7% of $H_3PO_4$ was thoroughly mixed with 100 lbs. of spray dried monocalcium phosphate oversize using a mixing time of about 50 seconds. The resulting mixture was passed through a ¼ inch vibrating screen to break up a relatively small proportion of lumps and then dried in a rotary air drier at a temperature of 95° C. The dried mixture was milled in a hammer mill and finally put through a 10 mesh screen. The product thus obtained was granular, free flowing and substantially non-caking in character and was further characterized by the following properties.

*Chemical analysis*

$$\frac{P_2O_5}{CaO} = \frac{59.18}{18.57} = 3.20$$

Free $H_3PO_4 = 15.91\%$

Ignition loss $= 22.01\%$

*Screen analysis*

| | | |
|---|---|---|
| R10 | | Trace |
| CR20 | per cent | 16.2 |
| CR50 | do | 92.0 |
| CR80 | do | 97.2 |
| S80 | do | 2.8 |

EXAMPLE III

The procedure set forth in Example II was repeated using 43.5 lbs. instead of 36 lbs. of 80.7% $H_3PO_4$.

The monocalcium phosphate thus prepared was dry, granular, free flowing and substantially non-caking in character and had the following chemical and screen analysis:

*Chemical analysis*

$$\frac{P_2O_5}{CaO} = \frac{58.24}{17.73} = 3.28$$

Free $H_3PO_4 = 18.2\%$

*Screen analysis*

| | |
|---|---|
| R10 | Trace |
| CR20 | per cent 60.0 |
| CR50 | do 88.0 |
| CR80 | do 94.0 |
| S80 | do 6.0 |

EXAMPLE IV

Four batches of monocalcium phosphate were prepared by mixing together in a Baker-Perkins mixer for 1 minute 36 lbs. of 80.72% $H_3PO_4$ and 100 lbs. of monocalcium phosphate having the following chemical and screen analysis:

| | Regular 1 | Granular 2 | Semigranular 3 | Oversize 4 |
|---|---|---|---|---|
| CHEMICAL ANALYSIS | | | | |
| CaO | 23.60 | 23.12 | 23.36 | 23.24 |
| $P_2O_5$ | 55.94 | 55.76 | 55.76 | 55.85 |
| Ignition Loss | 20.51 | 20.08 | 20.29 | 20.67 |
| Total | 100.05 | 98.96 | 99.41 | 99.76 |
| SCREEN ANALYSIS | | | | |
| $R_{10}$ | 0 | 0 | 0 | 1.5 |
| $CR_{20}$ | 0 | 0 | 0 | 4.8 |
| $CR_{50}$ | Tr | 0 | Tr | 34.6 |
| $CR_{80}$ | 2.0 | Tr | 0.3 | 76.5 |
| $CR_{200}$ | 38.2 | 98.8 | 50.6 | 98.0 |
| $S_{200}$ | 61.8 | 1.2 | 49.4 | 2.0 |

The foregoing mixtures were passed through a ¼ inch vibrating screen and then dried in a rotary kiln with air heated to approximately 80° C. The dried products were analyzed and found to have the following chemical and screen analysis, the numerals 1', 2', 3' and 4' designating the products made from samples 1, 2, 3 and 4 respectively.

| | 1' | 2' | 3' | 4' |
|---|---|---|---|---|
| CHEMICAL ANALYSIS | | | | |
| CaO | 17.44 | 17.33 | 17.29 | 17.55 |
| $P_2O_5$ | 57.21 | 57.59 | 57.81 | 57.80 |
| Ignition Loss | 25.35 | 25.16 | 24.80 | 25.10 |
| Total | 100.00 | 100.08 | 99.90 | 100.45 |
| SCREEN TEST | | | | |
| $R_{10}$ | 23.0 | 10.5 | 30.0 | 8.0 |
| $CR_{20}$ | 43.4 | 18.6 | 43.6 | 39.8 |
| $CR_{50}$ | 93.0 | 96.1 | 98.6 | 99.1 |
| $CR_{80}$ | 98.1 | 99.1 | 99.4 | 99.9 |
| $CR_{200}$ | 98.8 | 100.0 | 100.0 | 100.0 |
| $S_{200}$ | 0.2 | tr | tr | tr |

The above products were milled in a hammer mill and screened to remove plus 10 mesh material, thus yielding in each case a readily soluble, granular, free flowing substantially non-caking monocalcium phosphate having a high content of $P_2O_5$. These products were found to be particularly suitable for use as fruit acid substitutes in the production of powdered beverages.

The products of the present invention are relatively coarse as compared with the monocalcium phosphate used in preparing the phosphoric acid mix, thus demonstrating that agglomeration takes place in the mixing and rotary drying steps. This is further confirmed by the fact that examination under a microscope shows that these products consist of clusters of granular monocalcium phosphate.

The various conditions of operation of the present process will now be discussed in greater detail.

The monocalcium phosphate and phosphoric acid are mixed in the proportions calculated to yield a product containing $P_2O_5$ in an amount corresponding to a free $H_3PO_4$ content of from 1 to 18.5%. When a fruit acid substitute is desired, the $P_2O_5$ content of the product is restricted to a value equivalent to a free acid content of from 10% to 18.3% $H_3PO_4$ and within this range a $P_2O_5$ content equivalent to 14% $H_3PO_4$ is preferred.

The mixing operation is carried out by adding and mixing phosphoric acid with monocalcium phosphate within a period of from 0.5 to 5 minutes, but the most satisfactory results are obtained by using a mixing time of about 1 minute.

The particle size of the monocalcium phosphate plays an important role in determining the free flowing, non-caking character of the product. In general, when the product is to be used in the preparation of beverage powders, the major proportion of the monocalcium phosphate used in making the phosphoric acid mix should have a particle size of not less than 200 mesh, preferably not less than 100 mesh, and not greater than 10 mesh. For optimum results, substantially all of the monocalcium phosphate should pass through a 10 mesh screen and be retained by a 50 mesh screen.

After the monocalcium phosphate and phosphoric acid have been intimately mixed, the product is put through a coarse vibrating screen or another suitable device to break up any lumps which may be present.

The screened product is then dried at a temperature of from 60° C. to 100° C. and preferably at a temperature of from 90° C. to 100° C.

The drying operation may be carried out under atmospheric or reduced pressure and when the latter procedure is employed, the product is preferably heated at a temperature of from 60° C. to 75° C while being subjected to an absolute pressure of 20 millimeters of mercury.

Any suitable equipment may be employed in this step of the process, but I prefer to dry the product in a stainless steel rotary drier heated with hot air at 90° C. to 100° C.

The dried product is milled in a hammer mill or another suitable mill to break up whatever lumps may be formed. At the completion of this operation, the product is screened to the desired size. When the product is to be used as a fruit acid substitute in the preparation of water soluble beverage powders the milled product is passed through a 10 mesh screen.

By properly selecting relatively coarse monocalcium phosphate, the initial screening and also the milling step may be omitted. Therefore, stated broadly, the present process involves intimately mixing phosphoric acid with monocalcium phosphate, drying the resulting mixture and then screening the dried product to the desired size.

The products of the present invention are readily soluble in aqueous media and possess a high content of free $H_3PO_4$; in addition they are granular, free flowing and substantially non-caking in character and may be stored indefinitely in closed containers without encountering an appreciable amount of lumping. They are distinguished from the monocalcium phosphate of the prior art in that they combine all of the foregoing properties in a single product.

The foregoing detailed description has been given for the purpose of illustrating the preferred methods of carrying out the invention and it should be clearly understood that the invention is not restricted thereto.

I claim:

1. The method of producing a readily soluble, granular free flowing, substantially non-caking composition consisting of monocalcium phosphate and 15.74% by weight of free $H_3PO_4$, which comprises intimately mixing together for 3 to 5 minutes 100 lbs. of spray dried monocalcium phosphate having the following screen analysis

| | Per cent |
|---|---|
| +8 | 0.8 |
| —80+200 | 20.4 |
| —200 | 79.6 | and 36 lbs. of 80% $H_3PO_4$, passing the resulting mixture through a ¼ inch vibrating screen, drying the screened product in a rotary drier heated with hot air at 90° C. to 100° C., milling and then screening the dried product through a 10 mesh screen.

2. The method of producing a readily soluble, granular, free flowing, substantially non-caking composition consisting of monocalcium phosphate and 18.2% by weight of free $H_3PO_4$, which comprises mixing together for about 50 seconds 100 lbs. of spray dried monocalcium phosphate oversize and 43.5 lbs. of 80.7% $H_3PO_4$, passing the resulting mixture through a ¼ inch vibrating screen, drying the screened product in a rotary drier at a temperature of 95° C., milling and then screening the dried product through a 10 mesh screen.

3. The method of producing a readily soluble, dry, agglomerated, free flowing, substantially non-caking composition consisting of monocalcium phosphate and from 5% to 18% by weight of free $H_3PO_4$, which comprises intimately mixing together for 0.5 to 5 minutes spray dried monocalcium phosphate and phosphoric acid in the proportions calculated to yield the above composition, passing the mixture through a ¼ inch screen, drying the screened product, milling and then screening the dried product through a 10 mesh screen, said monocalcium phosphate prior to admixture with said phosphoric acid having a particle size of from +200 mesh to —10 mesh.

4. The method of producing a readily soluble, dry, agglomerated, free flowing, substantially non-caking composition consisting of monocalcium phosphate and from about 10% to about 18% by weight of free $H_3PO_4$, which comprises intimately mixing together for 3 to 5 minutes spray dried monocalcium phosphate and phosphoric acid in the proportions calculated to yield the above composition, passing the mixture through a ¼ inch screen, drying the screened product in a rotary dryer with air heated to a temperature of from 60° C. to 100° C., milling and screening the dried product through a 10 mesh screen, said monocalcium phosphate prior to admixture with said phosphoric acid having a particle size of from +200 to —10 mesh.

5. The method of producing a readily soluble, dry, agglomerated, free flowing, substantially non-caking composition consisting of monocalcium phosphate and about 14% by weight of free $H_3PO_4$, which comprises intimately mixing together for about 1 minute spray dried monocalcium phosphate and phosphoric acid in the proportions calculated to yield the above composition, passing the mixture through a ¼ inch screen, drying the screened product in a rotary dryer with air heated to a temperature of from 90° C. to 100° C. milling and screening the dried product through a 10 mesh screen, said monocalcium phosphate prior to admixture with said phosphoric acid having a particle size of from +50 to —10 mesh.

WILLIAM L. ROBINSON.

REFERENCES CITED

The following references are of record in the file of this patent:

UNITED STATES PATENTS

| Number | Name | Date |
|---|---|---|
| 1,442,318 | Whittier | Jan. 16, 1923 |
| 1,538,910 | Stokes | May 26, 1925 |
| 1,924,137 | Stokes | Aug. 29, 1933 |
| 2,291,608 | Cobbs | Aug. 4, 1942 |
| 2,332,735 | Lyons | Oct. 26, 1943 |
| 2,424,992 | Lee | Aug. 5, 1947 |

FOREIGN PATENTS

| Number | Country | Date |
|---|---|---|
| 330,777 | Great Britain | June 19, 1930 |
| 426,472 | Great Britain | Apr. 1, 1935 |